United States Patent [19]

Bickham

[11] 4,354,778

[45] Oct. 19, 1982

[54] WATERFALL TECHNIQUE FOR REMOVING SETTLED COAL SOLIDS FROM A STORAGE FACILITY

[75] Inventor: Kenneth L. Bickham, Spring, Tex.

[73] Assignee: Shell Oil Company, Houston, Tex.

[21] Appl. No.: 955,674

[22] Filed: Oct. 30, 1978

[51] Int. Cl.³ .............................................. B65C 53/02
[52] U.S. Cl. .................................... 406/137; 209/458
[58] Field of Search ................ 406/24, 19, 38, 136, 406/137, 144, 164, 113, 134; 414/142; 405/57, 58, 271; 209/500, 485, 488, 460, 458

[56] References Cited

U.S. PATENT DOCUMENTS 3,033,371  5/1962  Hobart .............................. 209/458
3,329,287  7/1967  Koning .............................. 406/137

Primary Examiner—Andres Kashnikow
Assistant Examiner—Gene A. Church

[57] ABSTRACT

This invention pertains to a method and apparatus for removing compacted, slurriable solids from a vessel by water erosion. The water erosion is effected by a waterfall created through the use of a travelling bridge which traverses the compacted solids and coacts with a movable gate which allows a nearly vertical face of the compacted solids to be exposed to the waterfall.

20 Claims, 1 Drawing Figure

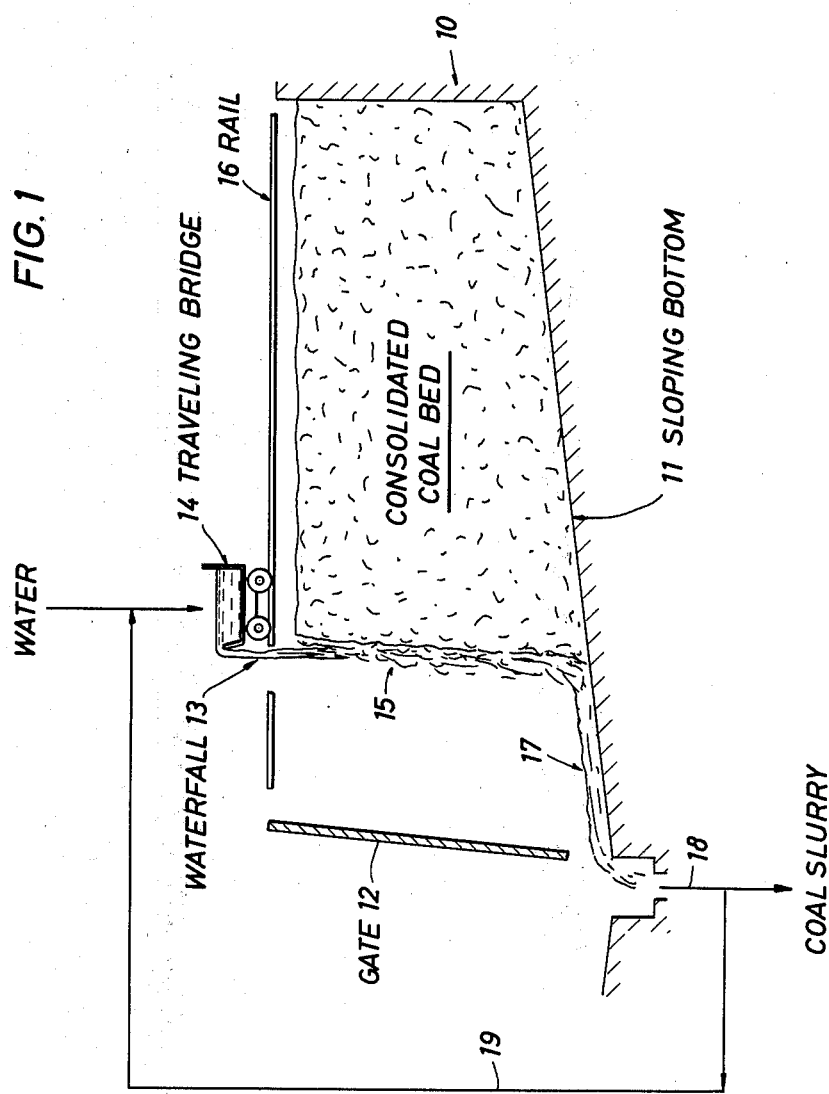

WATERFALL TECHNIQUE FOR REMOVING SETTLED COAL SOLIDS FROM A STORAGE FACILITY

BACKGROUND OF THE INVENTION

It is necessary to move various ore and mineral solids to and from vessels or containers in which such solids are stored and/or transported. In some instances, the storage and/or transport vessel may be the hold of a ship, barge or other carrier and in other instances, it may be a storage vessel forming part of a shore installation slurry system. Also, it may be an intermediate storage system at the beginning, an intermediate point, or the termination of a trunk or branch slurry pipeline. It has been found possible to pump a slurry of solids into such a storage vessel after which the solids are permitted to settle by gravity leaving an overlying fraction of liquid. The liquid fraction is then removed by decantation to leave a settled mass of solids. If the storage vessel is the hold of a ship or barge, normal movement of the ship or barge and vibration of its machinery causes compaction of the settled solids so that, at destination, the compacted mass of settled solids is difficult to remove. It does not flow and strongly resists being reslurried since it becomes a very cohesive solid with considerable structural strength and high resistance to flow. Similar difficulties arise in shore based installations and make it difficult to reslurry a settled, compacted slurry from storage tanks.

Prior art considered relevant to the present invention includes U.S. Pat. Nos. 3,690,730; 2,957,493; 3,329,287; 3,421,639; 3,606,479 and 3,382,011.

SUMMARY OF THE INVENTION

This invention generally pertains to a method and apparatus for removing slurriable solids which have become settled and compacted during storage and/or transport by subjecting the solids to erosion by a falling liquid, e.g., a waterfall.

More particularly, this invention relates to the use of kinetic energy from a gravity driven waterfall to controllably dislodge particles in a compacted bed of slurriable solids and form a slurry with a desirable consistency. The waterfall may require the use of low pressure jets to supplement reslurrification. The fluid used in the waterfall may be a slurry with a concentration of solids less than the desired concentration as well as all liquid.

Even more particularly, this invention pertains to a method for removing slurriable solids which have become settled and compacted during storage and/or transport by allowing the solids to settle and compact in a container having a sloping bottom and a removable side located adjacent the low end of the sloping bottom, removing the removable side of the container and exposing the adjacent part of the compacted solids, subjecting the exposed solids to a liquid waterfall or waterfall and low pressure jet to form a slurry which falls to the bottom of the container, and allowing the slurry to exit the container via the sloping bottom.

The present invention also pertains to an apparatus for removing slurriable solids which have become settled and compacted during storage and/or transport. Such apparatus includes a container having a sloping bottom and a removable side located adjacent the low end of the sloping bottom, means for removing the side of the container and exposing the adjacent part of the compacted solids, and means for subjecting the exposed compacted solids to a liquid waterfall or waterfall and low pressure jet to form a slurry thereof which falls to the bottom of the container, and means for removing the slurry via the sloping bottom. Preferably, the removable side is inclined, and a travelling bridge is positioned over the compacted bed to provide a waterfall which erodes the face of the bed.

While the present invention is particularly useful for reslurrification of compacted solids in marine vessels, an at least equally important use of this invention is for intermediate storage in a slurry transport pipeline. In a slurry transport system this invention is applied to decouple slurry preparation from the slurry pipeline, to decouple a trunk pipeline from branch pipelines, and to decouple the slurry pipeline from a dewatering facility.

BRIEF DESCRIPTION OF THE DRAWINGS

FIG. 1 is a schematic of a system for storing and reslurrying a compacted bed of solids.

DESCRIPTION OF PREFERRED EMBODIMENT

As disclosed herein, the present invention concerns a method and apparatus for the reslurrification of solid particulate matter in a liquid, usually water. The solids can be of any solid particulate matter of a character comparable to particulate mineral ores such as iron ore or coal and the liquid can be fresh water, sea water, brine or even non-aqueous liquids such as petroleum liquids or petroleum derived liquids such as methyl alcohol. For purposes of setting forth an example of the invention herein, however, the present disclosure is particularly directed to the slurrification and handling of coal in a water-solids system. A special example hereinafter is related to a system of methyl alcohol and coal for reasons as will be apparent. As used herein, mineral solids is meant to include both ores and dressed ores as well as all other comparable particulate matter and/or products capable of being prepared into a pumpable slurry. Coal is meant to include all grades of coal such as bituminous, lignite, anthracite, etc.

As applied to a ship installation, the method and apparatus of the present invention are meant to extend not only to ships but also to barges and the like. Thus, the sloping bottom required of the container holding the consolidated solids bed of the present invention requires a slight angle of slope which is particularly adapted to a barge which has an almost flat bottom. In the case of ships, having a more pointed bottom, it may be desirable to use a false bottom for the consolidated coal bed. In forming the consolidated coal bed of the present invention, suitable solids for slurrification may be subdivided by known procedures whereby the solids are small enough to be capable of dispersion in a suitable liquid, such as water, so that a slurry suspension is obtained. It is, of course, evident that with liquids of higher specific gravities, particles of greater size may be utilized. Thus, commonly, with water it is useful to employ sizes of coal up to about one-quarter inch or less although one-eighth inch or less is generally preferred. Sufficient water or other liquid is mixed or agitated with the particulate solids to form a slurry of a pumpable consistency which is then pumped through a long or short distance pipeline into water-tight holds of a ship or other vessel for containing the coal. There the slurry is allowed to settle into an upper fraction or layer predominantly consisting of clear water or other liquid covering layers or fractions of settled material having a higher solids concentration than the slurry. After settling, the liquid is decanted, leaving each hold containing a substantially non-shifting cargo of solids in which form it is transported to destination. During the voyage to destination, the contents of the holds become compacted through a combined action of the motion of the ship or barge in the seaway and the vibration of its engines as applied to a mass having considerable hydrostatic pressure. The action causes the voids or liquid in the mass to become expressed and the solids do attain a density of about 55% or greater volume solids; in which form, a compacted bed is formed.

The present invention is also applicable to shore installations such as a natural canyon or other vessel for containing the consolidated solids bed. As above mentioned, in an onshore slurry transport system, the invention may be applied to decouple slurry preparation from the slurry pipeline, to decouple a trunk pipeline from branch pipelines, and to decouple the slurry pipeline from a dewatering facility. In the case of a natural canyon, it is, of course, evident that the bottom of the canyon must be graded or otherwise formed into a sloping bottom to take advantage of the present invention as more particularly described hereinafter; otherwise, the use of onshore installations does not substantially differ from the use of a ship installation except that artificial vibration must be employed to cause the solids to settle and form a compacted bed. Thus, it may be sufficient to use the vibration of an off-balance engine which is in contact with the earth in the case of a canyon, adjacent to the solids bed to be settled, or in the case of other containment means such as a stationery vessel, in contact with the vessel to cause a minor amount of vibration which is sufficient to cause the bed to settle and compact.

Having thus briefly described the container and the types of solids and liquids which are useful with the invention, the following will more particularly describe FIG. 1 of the specification which discloses a specific example of the invention. Container 10 shown in FIG. 1 might be the sides and bottom of a natural canyon or other storage means. Obviously, the dimensions of the invention are particularly adapted to a barge since the sloping bottom 11 of the container is of a gradual slope, generally having an angle of 7 to 20 degrees with horizontal. At the opposite side of the container is a gate 12 which slopes inwardly of the consolidated coal bed at an angle of 5 to 20 degrees with vertical. When this gate is removed away from the bed to expose one face of the bed, it provides a natural slope so that erosion may readily occur without otherwise refining that surface of the bed. A waterfall 13, utilized to erode the bed, falls from a travelling bridge 14 which supplies water or some other liquid which passes down and erodes the front of the bed 15. The erosion process may be supplemented by using low pressure nozzles directed at the front of the bed. The travelling bridge may traverse back and forth as it moves toward the fixed side of the container or it may be simply pulled straight back over rail 16 if the waterfall covers the entire face of the bed. The waterfall may pass substantially straight down the face of the bed, or the travelling bridge may be so positioned forward of the face of the bed as to direct the water against the face of the bed.

The waterfall preferably is created by efficient nozzles, by which it is meant nozzles that convert pressure across the nozzle into kinetic energy most efficiently. The prior art typically uses high pressure jets of 500 psi or greater in order to reslurry coal which has become compacted. Due, however, to the unique configuration of the present invention, it is preferred to use a low pressure jet of 30 to 100 psi and allow gravity to essentially accomplish the results of the invention. The slope of the vessel bottom 11 is such that the turbulence which occurs at the bottom of the vessel 17 as the slurry flows waterfall 15 is sufficient to keep the solids suspended in the liquid until it can pass into conduit 18 and out of the bed. Recycle stream 19 allows the recycling or recirculation of up to 35% by volume of the slurry. This insures that the slurry contains as little water as necessary. Of course, it is evident that other means known to the art may be practiced for reducing the amount of water in the slurry.

As above noted, the liquid in the waterfall may be a part of a slurry of lower solids concentration than the solids concentration of the slurry exiting the bed. Accordingly, a waterfall slurry would have a solids concentration of 5 to 30 percent by volume, compared to a solids concentration of 30 to 55 percent in the slurry exiting the bed. The waterfall slurry might also have a different particle size distribution of 0 to 14 mesh compared to that of the slurry exiting the bed of 0 to ¼ inch.

As above mentioned, instead of a liquid such as water for forming the slurry of the present invention, another liquid such as methyl alcohol may be employed. Substitution of methyl alcohol for water may be particularly attractive in arid areas where the alcohol can be manufactured at the mine site from a portion of the coal, then employed to slurry the coal in accordance with the invention from the above described compacted bed, sent to some destination by pipeline, and ultimately burned with the coal.

I claim as my invention:

1. A method for removing slurriable solids which have become settled and compacted during storage and/or transport comprising, allowing the solids to settle and compact in a container having a sloping bottom and a removable gate located adjacent the low end of the sloping bottom, removing the gate of the container and exposing the adjacent part of the compacted solids, subjecting the exposed solids to falling liquid to form a slurry which falls to the bottom of the container, and allowing the slurry to exit the container via the sloping bottom.

2. The method of claim 1 wherein the removable gate is inclined and the exposed part of the compacted solids forms an outwardly sloping wall such that vertically falling liquid strikes the face of the wall.

3. The method of claim 2 wherein the falling liquid is directed downwardly at an acute angle of less than 5 degrees against the sloping wall of solids.

4. The method of claim 2 wherein the falling liquid is directed downwardly at an acute angle of from 40 degrees to 5 degrees against the sloping wall of solids.

5. The method of claim 1 wherein up to 35% volume of the exiting slurry is recycled to form part of the falling liquid.

6. The method of claim 1 where the liquid is water and the solids are coal.

7. The method of claim 1 wherein the falling liquid is with a slurry of lower solids concentration than the solids concentration of the slurry exiting the container.

8. The method of claim 1 wherein the falling liquid is with a slurry of different particle size distribution than the slurry exiting the container.

9. The method of claim 1 where the liquid is methyl alcohol and the solids are coal.

10. The method of claim 9 wherein the methyl alcohol is made from coal.

11. The method of claim 10 wherein the methyl alcohol and coal are sent to a terminal station and combusted together.

12. The method of claim 1 wherein the container is a barge.

13. The method of claim 1 wherein the container is a naturally occurring canyon.

14. The method of claim 11 wherein vibration is applied in the vicinity of the canyon to cause the solids to compact during storage.

15. The method of claim 1 wherein the exposed compacted solids are exposed to both falling liquid, propelled only by gravitational forces, and to low pressure liquid jetting.

16. An apparatus for removing slurriable solids which have become settled and compacted during storage and/or transport comprising, a container having a sloping bottom and a removable gate located adjacent the low end of the sloping bottom, means for removing the gate of the container and exposing the adjacent part of the compacted solids, and means for subjecting the exposed compacted solids to falling liquid to form a slurry thereof which falls to the bottom of the container, and means for removing the slurry via the sloping bottom.

17. The apparatus of claim 16 wherein the removable gate is inclined and the exposed part of the compacted solids forms an outwardly sloping wall such that vertically falling liquid strikes the face of the wall.

18. The apparatus of claim 16 wherein the means for jetting comprises at least one nozzle downwardly directed from a travelling bridge traversible located on a rail above the container of compacted solids.

19. The apparatus of claim 16 wherein the container forms half of a barge or vessel.

20. The apparatus of claim 16 wherein the means for subjecting the exposed compacted solids to falling liquid includes means for subjecting said solids to low pressure jetting.

* * * * *